July 14, 1959  D. G. KARRAKER  2,894,817
POLONIUM SEPARATION PROCESS
Filed Dec. 13, 1950

INVENTOR.
DAVID G. KARRAKER
BY
Roland A. Anderson
ATTORNEY.

United States Patent Office 2,894,817
Patented July 14, 1959

2,894,817

POLONIUM SEPARATION PROCESS

David G. Karraker, Berkeley, Calif., assignor to the United States of America as represented by the United States Atomic Energy Commission Application December 13, 1950, Serial No. 200,655

7 Claims. (Cl. 23—102)

This invention relates to the recovery and purification of polonium, and especially to a liquid-liquid extraction process employing tributyl phosphate as an extracting agent for the recovery and purification of polonium.

Polonium as found in nature results from the radioactive decay of naturally radioactive elements and is itself extremely radioactive. In fact, the longest lived polonium isotope ($Po^{208}$) now known has a half-life of three years. Due to the short half-lives of its isotopes, the abundance of polonium in nature is quite low. With the advent of high energy particle accelerators and other particle sources, it has become possible to augment the natural sources of polonium isotopes as well as to make previously unknown polonium isotopes. This artificial polonium production has been achieved by bombarding lead with alpha particles and also by bombarding bismuth with neutrons, deuterons, or protons.

In obtaining polonium from natural sources, the final separation step (i.e., after removal of the chief impurities) involves separating polonium from bismuth and lead impurities. Likewise, artificially prepared polonium must be recovered from massive quantities of lead or bismuth.

As a result of the different decay modes of the various polonium isotopes, pure polonium and its compounds upon standing build up appreciable quantities of bismuth, lead, and other secondary impurities. Thus, in processes or investigations requiring the use of pure polonium or its compounds, the polonium which was pure at one time must be repurified to free it of accumulated decay products. In view of the short half-lives of polonium isotopes, it will be appreciated that such purifications must be done efficiently within short periods of time. It is to be noted that any chemical procedure involving polonium should be operable from a distance in order that the operator may be adequately protected from the intense radioactivity associated with polonium. Experience has shown that extraction processes such as that utilized in the present invention are easily accomplished at a distance and require a minimum of expenditure in providing adequate shielding of the operator from radioactivity.

It is therefore an object of the present invention to provide an extraction process for efficiently and quickly separating polonium from lead and bismuth impurities.

Another object is to provide a multiple extraction process for the recovery of polonium from lead and bismuth impurities.

A further object is to provide an extraction process for the purification and recovery of polonium from its decay products.

One other object of the invention is to employ an organic solvent phase containing tributyl phosphate to specifically extract polonium from an aqueous chloride solution.

Still another object is to employ an aqueous nitrate solution to extract polonium from an organic solvent phase containing tributyl phosphate.

Other objects and advantages of the invention will become apparent upon consideration of the following description taken in conjunction with the attached drawing, of which:

Figure 1:
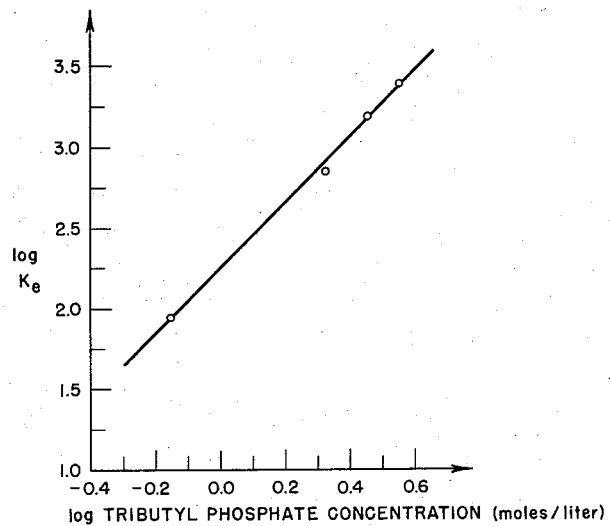
Figure 1 is a log-log plot of the polonium extraction coefficient, $K_e$, versus tributyl phosphate concentration.

In liquid-liquid extraction processes, as employed in the present invention, a first liquid phase containing a material to be recovered and associated impurities is contacted with a second non-miscible liquid phase under such conditions that the material to be recovered is extracted preferentially into the second phase while the majority of the impurities remain in the first liquid phase. Thereafter the second liquid phase may be washed with a suitable reagent (also immiscible with the second phase) in order to remove any impurities which may have been extracted with the desired material.

In general, the success of such extraction processes depends on the differences in extractibility of the material to be recovered and that of the impurities associated with it. The criterion of extractibility of a substance may be expressed in terms of an extraction coefficient, which is defined as the ratio of the concentration of the substance in one phase to that in a second phase when the two phases are in equilibrium.

As an illustration of the use of such extraction coefficients, one may consider the separation of two substances A and B, whose extraction coefficients between a first liquid phase $\phi_1$ and a second liquid phase $\phi_2$ are known to be $$A_{\phi_2}/A_{\phi_1}=20 \text{ and } B_{\phi_2}/B_{\phi_1}=0.1$$

i.e., the ratio of the concentration of A in $\phi_2$ to that of A in $\phi_1$ at equilibrium equals 20 and the ratio of the concentration of B in $\phi_2$ to that of B in $\phi_1$ at equilibrium equals 0.1. Thus if the first liquid phase $\phi_1$ containing 1 mole/liter each of A and B initially is contacted with a second non-miscible phase $\phi_2$, after equilibrium is achieved $\phi_2$ will contain 0.947 mole/liter of A and 0.091 mole/liter of B, while $\phi_1$ will contain 0.053 mole/liter of A and 0.909 mole/liter of B. If these two phases are then separated and $\phi_1$ and $\phi_2$ are repeatedly contacted with additional pure $\phi_2$ and $\phi_1$, respectively, it is apparent that the final $\phi_1$ phase will eventually contain pure B and the final $\phi_2$ phase will contain pure A.

It has now been discovered that under suitable conditions polonium may be separated from bismuth and lead by employing tributyl phosphate (dissolved in an organic solvent such as dibutyl ether) as a specific extractant for polonium.

One principal embodiment of the present invention consists of the single or multiple extraction of an aqueous phase containing polonium values in admixture with lead and bismuth values with an organic, water-immiscible phase consisting of tributyl phosphate dissolved in dibutyl ether whereby the polonium is preferentially extracted into the organic phase while the lead and bismuth values remain in the aqueous phase.

Another principal embodiment consists of purifying polonium from its decay products by singly or multiple extracting a dibutyl ether-tributyl phosphate phase containing polonium and associated products of the radioactive decay thereof with an aqueous hydrochloric acid phase or other acidic chloride phase whereby the decay products are removed from the dibutyl ether-tributyl phosphate phase while the polonium remains therein.

While the mechanism for the distribution of polonium between an aqueous phase and a tributyl phosphate-dibutyl ether phase is not known in detail, numerous experiments have revealed that the extraction behavior of polonium is dependent on the concentration of tributyl phosphate in the dibutyl ether and the type and concentration of anion present in the aqueous phase.

The tables presented below summarize the experimental data demonstrating the dependence of the polonium extraction coefficient (hereinafter referred to as $K_e$) on the tributyl phosphate concentration and the concentration of various anions. It is to be understood that $K_e$ is herein defined as the ratio of the polonium concentration in the organic phase (dibutyl ether-tributyl phosphate) to the polonium concentration in the aqueous phase when the two phases are in equilibrium. In determining $K_e$, advantage was taken of the radioactivity of the polonium for if the counts per unit time of equal volume samples from the two phases in equilibrium are determined, the ratio of the counts per unit time for the organic phase sample to that for the aqueous phase sample is exactly equal to $K_e$, as defined above. In each series of experiments the ionic strength and hydrogen ion concentration (moles/liter) were kept constant at a value of six.

TABLE I

*Variation of $K_e$ with tributyl phosphate concentration*

[Aqueous phase is 6 molar HCl]

| Tributyl Phosphate (moles/liter) | Polonium (counts/min. in aqueous phase) | Polonium (counts/min. in organic phase) | $K_e$ |
|---|---|---|---|
| 0.702 | 192 | 15,930 | 90.3 |
| 2.1 | 150 | 17,530 | 730 |
| 2.8 | 76 | 12,360 | 1,540 |
| 3.5 | 127 | 14,400 | 2,400 |

TABLE II

*Variation of $K_e$ with various $Cl^-$, $ClO_4^-$ mixtures*

| $Cl^-$ (moles/liter) | $ClO_4^-$ (moles/liter) | Polonium (counts/min. in aqueous phase) | Polonium (counts/min. in organic phase) | $K_e$ |
|---|---|---|---|---|
| 2.0 | 4.0 | 14,060 | 4,840 | 0.345 |
| 3.0 | 3.0 | 29,850 | 9,190 | 0.31 |
| 4.0 | 2.0 | 25,130 | 11,730 | 0.467 |
| 4.5 | 1.5 | 22,870 | 19,490 | 0.85 |
| 5.0 | 1.0 | 14,280 | 18,930 | 1.325 |
| 5.5 | 0.5 | 5,980 | 30,630 | 5.1 |

TABLE III

*Variation of $K_e$ with various $Cl^-$, $NO_3^-$ mixtures*

| $Cl^-$ (moles/liter) | $NO_3^-$ (moles/liter) | Polonium (counts/min. in aqueous phase) | Polonium (counts/min. in organic phase) | $K_e$ |
|---|---|---|---|---|
| 3.0 | 3.0 | 14,550 | 490 | 0.0337 |
| 4.0 | 2.0 | 15,580 | 920 | 0.0590 |
| 4.5 | 1.5 | 37,750 | 2,750 | 0.0736 |
| 5.0 | 1.0 | 20,630 | 12,510 | 0.606 |
| 5.5 | 0.5 | 5,635 | 23,950 | 4.26 |
| 6.0 | 0.0 | 293 | 32,490 | 111.0 |

Inspection of Table I shows that increasing the tributyl phosphate concentration in the dibutyl ether effects a corresponding increase in the value of $K_e$. This effect is clearly seen by referring to Fig. 1 which is a log-log plot of the data contained in Table I. Since the slope of the line in Fig. 1 is approximately two, $K_e$ exhibits a second order dependence on the tributyl phosphate concentration. In other words, if the tributyl phosphate concentration is tripled, the value of $K_e$ increases approximately nine-fold.

Figure 2:
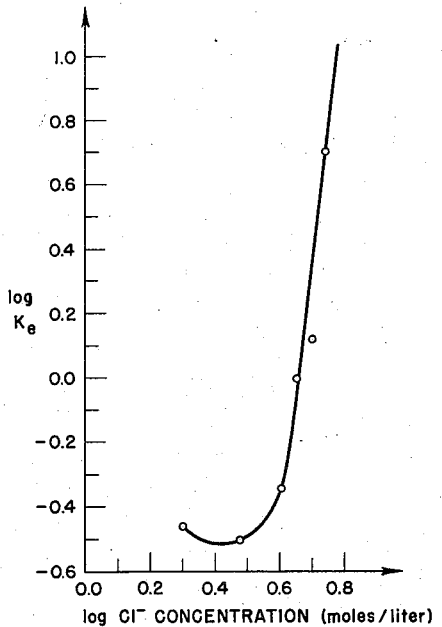
Figure 2 is a log-log plot of the polonium extraction coefficient, $K_e$, versus chloride ion concentration in the presence of perchlorate ions.

The dependence of $K_e$ upon the type and concentration of anion present in the aqueous phase may be seen by considering Tables II and III. In each of the experiments recorded in these tables, the total anion concentration was kept at six molar. Referring now to Table II, it is apparent that $K_e$ increases enormously when the $Cl^-$ concentration is increased. This increase is further illustrated by Fig. 2, which also shows, as a first approximation, that the effect of $ClO_4^-$ on the value of $K_e$ is negligible.

Figure 3:
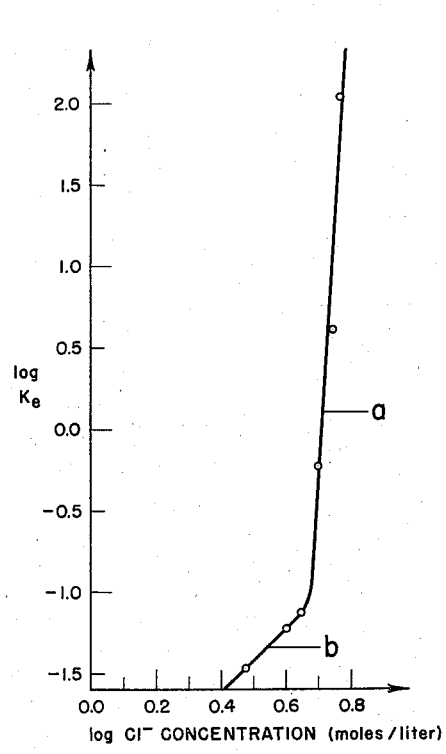
Figure 3 is a log-log plot of the polonium extraction coefficient, $K_e$, versus chloride ion concentration in the presence of nitrate ions.

In Table III, the values of $K_e$ when the aqueous phase contains various proportions of $Cl^-$ and $NO_3^-$ are presented. A log-log plot of these data appears in Fig. 3. It is seen that this plot consists of two approximately linear segments which have been labeled *a* and *b*. The linear segment *a* represents the effect of $Cl^-$ on $K_e$ and is quite similar to the plot shown in Fig. 2. The linear segment *b* represents the effect of $NO_3^-$ on $K_e$. By comparing values for $K_e$ in Tables II and III, it is apparent that the presence of $NO_3^-$ in the aqueous phase has the effect of lowering the value of $K_e$. For example, $K_e$ has a value of 0.31 when the aqueous phase is 3 molar in $Cl^-$ and 3 molar in $ClO_4^-$ (Table II) while its value is a factor of ten lower when the aqueous phase is 3 molar in $Cl^-$ and 3 molar in $NO_3^-$ (Table III).

In summary, $K_e$ determines in which phase the polonium will preferentially accumulate. When $K_e$ is large, the polonium will accumulate in the organic phase (tributyl phosphate-dibutyl ether) and when $K_e$ is small, the polonium will accumulate in the aqueous phase. $K_e$ is made large by increasing the tributyl phosphate concentration in the dibutyl ether or by the provision of chloride ion in the aqueous phase. $K_e$ is made small by decreasing the concentration of tributyl phosphate in the dibutyl ether, decreasing the chloride ion concentration in the aqueous phase, or by the provision of nitrate ion in the aqueous phase.

Generally speaking, the extraction coefficients of lead and bismuth are much lower than that for polonium under the same conditions. For example, the extraction coefficient for bismuth (defined like that for polonium) has a value of 0.03 when the aqueous phase is 6 molar hydrochloric acid and the organic phase (dibutyl ether) is 0.7 molar in tributyl phosphate. The value for lead under the same conditions is almost identical to that for bismuth. This circumstance allows excellent separations of polonium from lead and bismuth to be achieved.

It is desirable to use an acidic aqueous phase in the practice of the invention in order to avoid the complication of precipitate formation due to the hydrolysis of lead, bismuth, etc. in the aqueous phase. Satisfactory operation has been achieved when the aqueous phase is about six molar in hydrogen ion concentration; however, it is considered that under some conditions, the hydrogen ion concentration may be varied considerably from this value without deleterious effect.

From the foregoing description of the conditions which govern the extraction of polonium, the general procedure to be followed in separating and purifying polonium from lead and bismuth may be outlined. First there is provided an aqueous solution of polonium in admixture with lead and bismuth. (If this solution contains any $NO_3^-$, it first must be removed prior to extraction in view of the lowering of $K_e$ by $NO_3^-$, as noted above.) To the aqueous solution is added a source of $Cl^-$ to insure a high value of $K_e$. This aqueous chloride phase is then extracted with a tributyl phosphate-dibutyl ether phase whereupon the polonium preferentially enters the organic phase. This polonium-bearing organic phase is then separated and washed with an aqueous chloride solution to remove any lead or bismuth which may have been extracted along with the polonium. It is important that a chloride solution be used in the washing so that the value of $K_e$ is maintained high and little polonium is lost from the organic phase. The highly purified polonium in the organic phase may be transferred to an aqueous solution by extracting the organic phase with an aqueous nitrate solution (which greatly diminishes $K_e$).

As will be apparent to those skilled in the art, the process of the present invention may be easily performed in a continuous fashion by employing two countercurrent extraction columns. In the first column an aqueous chloride stream is fed countercurrently to a tributyl phosphate-dibutyl ether stream. The polonium contaminated with lead and bismuth is center-fed into this column as an aqueous chloride solution. The tributyl phosphate-dibutyl ether stream leaving this column will contain very pure polonium values as a result of the efficient extraction and washing achieved. This organic stream may be stripped of its polonium content by passage through the second column countercurrently to an aqueous nitrate stream. Thus a highly purified polonium solution is easily produced in a continuous fashion by the process of the present invention.

Specific details of operation of the process of the invention will become apparent by considering the following examples:

EXAMPLE I

A lead sample weighing approximately five grams and containing polonium as the result of alpha particle bombardment was dissolved in 15 ml. of hot 6 M $HNO_3$. As a convenient expedient to remove the bulk of lead present, the solution was evaporated down to a small volume until it fumed strongly of nitric acid vapors. Since $Pb(NO_3)_2$ is not very soluble in concentrated $HNO_3$, most of the lead precipitated out of the solution as the nitrate. This precipitate was removed by centrifugation. One ml. of concentrated HCl was added to this supernatant and then the solution was fumed by heating. To insure complete destruction of the nitric acid present, this procedure was repeated eight times.

After removal of the nitric acid, the solution was diluted to 5 ml. and adjusted to 6 molar in HCl. This aqueous phase was extracted with an organic phase consisting of dibutyl ether approximately 0.7 molar in tributyl phosphate. The polonium-bearing organic phase was separated and washed with two successive 5 ml. portions of 6 M HCl to remove any remaining lead or bismuth. To provide an aqueous solution of purified polonium, the washed organic phase was extracted with 5 ml. of concentrated $HNO_3$. Radioactive analysis of a small aliquot of this nitric acid solution showed that the polonium was greater than 99% pure and that the solution contained approximately $1 \times 10^{10}$ atoms of polonium.

EXAMPLE II

Two grams of bismuth oxide ($Bi_2O_3$) which had been subjected to proton bombardment to form polonium were dissolved in 10 ml. of 6 M HCl. The resulting solution was extracted with a five ml. portion of a dibutyl ether solution approximately 0.8 molar in tributyl phosphate. The ether solution was then washed with two 5 ml. portions of 6 M HCl in order to remove any extracted lead or bismuth. Radioactive assay of an aliquot of the organic mixture showed that approximately $5 \times 10^8$ atoms of polonium in high purity was contained therein.

EXAMPLE III

One ml. of a dibutyl ether solution approximately 0.75 molar in tributyl phosphate which initially had contained $10^6$ counts/minute of $Po^{206}$ was allowed to stand for 9 days. At the end of this period, the decay products of the $Po^{206}$ were removed by washing the ether mixture with two 2 ml. portions of 6 M HCl. After washing, a radioactive assay of an aliquot of the ether mixture indicated that the mixture contained $5 \times 10^5$ counts/minute of $Po^{206}$ and no detectable decay products. The yield of $Po^{206}$ was 99% of theoretical.

It is to be understood, of course, that the above examples are merely illustrative and do not limit the scope of the present invention. The concentration of tributyl phosphate, chloride ion, etc. may differ from those employed in the examples and the extraction conditions may be modified in numerous respects as set forth in the foregoing description. Further, it is considered that other organic ethers may be employed instead of dibutyl ether as the tributyl phosphate solvent. These ethers should dissolve tributyl phosphate, be water-immiscible, and not adversely affect the extraction properties of polonium. Only such limitations should be imposed on the scope of the invention as are indicated in the appended claims.

What is claimed is:

1. In a method for separating polonium values from lead and bismuth impurities, the steps comprising contacting an acidic aqueous chloride phase containing said polonium values and impurities with an organic ether phase containing tributyl phosphate to preferentially extract the polonium values into the organic ether phase, separating said phases, then contacting said organic phase with an aqueous hydrochloric acid phase to remove remaining impurities, and finally recovering said polonium from the organic phase by extracting said phase with an acidic aqueous nitrate solution.

2. The method according to claim 1, wherein the organic ether phase is dibutyl ether.

3. In a method for purifying polonium values contaminated with radioactive decay products thereof, the steps comprising providing an organic phase of dibutyl ether and tributyl phosphate containing polonium and its decay products, extracting said organic phase with an acidic aqueous chloride phase to remove said decay products from the organic phase, separating the two phases, and extracting the separated organic phase with an acidic aqueous nitrate phase to obtain an aqueous solution of purified polonium values.

4. The method according to claim 3, wherein the aqueous chloride phase is hydrochloric acid of about 6 molar concentration.

5. In a method for recovering polonium values from a material also containing lead and bismuth impurities and including the treatment of dibutyl ether phase containing tributyl phosphate and polonium values, the step of extracting said polonium from the said dibutyl ether phase with an acidic aqueous nitrate solution.

6. A continuous method for separating and purifying polonium values from lead and bismuth impurities comprising continuously countercurrently contacting an organic ether phase containing tributyl phosphate with an acidic aqueous chloride phase containing said polonium and impurities to obtain purified polonium values in said organic ether phase, and then continuously countercurrently contacting said organic ether phase containing purified polonium values with an acidic aqueous nitrate phase to extract said purified polonium into said aqueous phase.

7. The method according to claim 6, wherein the organic ether phase is dibutyl ether.

References Cited in the file of this patent

UNITED STATES PATENTS 2,227,833   Hixson et al. _____ Jan. 7, 1941
2,443,168   Robson _____ June 8, 1948

OTHER REFERENCES

Warf: U.S. Atomic Energy Commission declassified Document No. AECD-2524, August 7, 1947, declassified March 11, 1949, 10 pages.